2,900,781
CONVERTIBLE YARD TOOLS

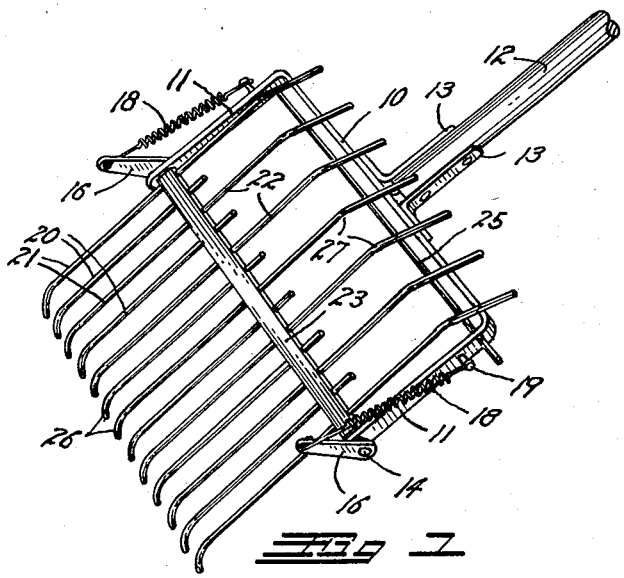
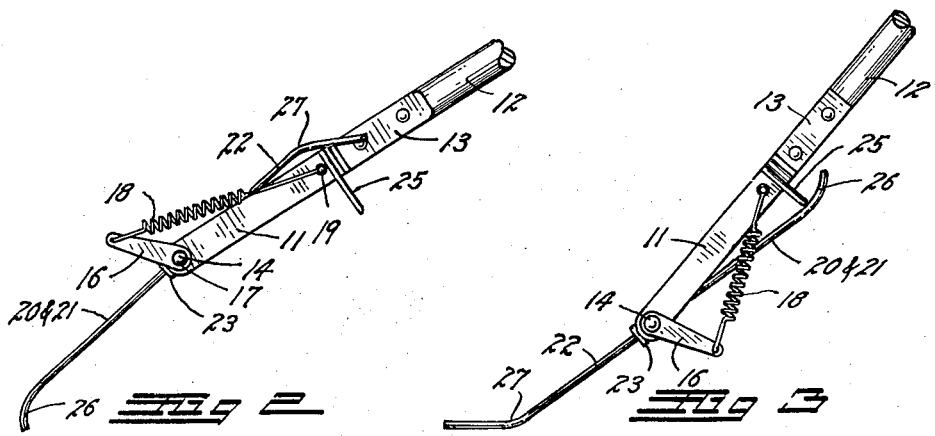
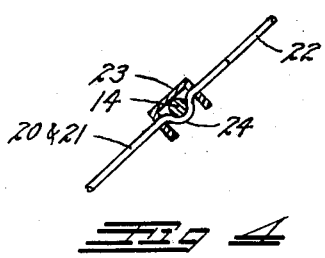
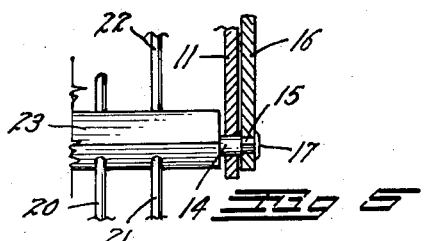
INVENTORS
HENRY P. SONDIE
WILLIAM F. PRALLE
BY
ATTORNEY

Henry P. Sondie, Denver, and William F. Pralle, Burlington, Colo., assignors to James T. Clark, Fort Morgan, Colo.

Application August 9, 1957, Serial No. 677,328

1 Claim. (Cl. 56—400.16)

This invention relates to what might be termed a convertible yard tool, and has for its principal object the provision of a garden and lawn tool which can be used as a conventional refuse sweep or rake and which, when desired, can be quickly and easily converted into a shovel-like, pitchfork-type tool for lifting, loading and gravelling purposes, and to so construct the tool that the conversion from a sweep rake to a pitchfork, and vice versa, can be instantly accomplished by simple pressure of the tool against the ground while the tool is in use so as not to interrupt the normal use of either tool.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved convertible tool, with the handle portion thereof partially broken away;

Fig. 2 is a side view of the tool of Fig. 1, showing the tool in the sweep-rake position;

Fig. 3 is a similar side view, illustrating the tool converted to the pitchfork or shovel position;

Fig. 4 is an enlarged cross-section through a cross frame member employed in the tool, illustrating the method of attaching the fork and rake tines thereto; and Fig. 5 is an enlarged, detail view of one extremity of the cross frame member, illustrating the means for mounting the cross frame member in the improved tool.

The improved convertible tool employs a horizontal frame portion 10 and two side frame arms 11 formed by bending a unitary metal bar in a U-shape. A handle 12 of any suitable length and type projects rearwardly from the yoke. The handle 12 is secured at the middle of the horizontal portion 10 in any desired manner, such as between attachment bracket ears 13.

A rotatable rake shaft 14 is rotatably mounted in the extremities of the side frame arms 11 and extends therebetween. The rake shaft preferably terminates in reduced or squared extremities 15 over each of which a spring lever 16 is rigidly fitted and locked in place by upsetting or riveting the extremities of the rake shaft, as shown at 17. The two spring levers 16 are constantly and resiliently drawn rearwardly by means of tension springs 18, there being one spring 18 extending between the extremity of each rake lever 16 to a suitable spring attachment pin 19 on the adjacent side frame member 11.

A plurality of relatively short, flexible sweep rake tines, 20, formed of spring wire, and a similar plurality of relatively longer sweep rake tines 21 are mounted on and extend forwardly and downwardly from the rake shaft 14. The longer tines 21 extend across and project oppositely from the rake shaft 14 to form fork teeth 22.

Particular attention is called to the manner in which the tines are attached to the rake shaft 14. This is accomplished by passing the tines through aligned perforations in a channel member 23. After the tines are in place, the rake shaft 14 is forced through the channel member behind the tines, flexing them outwardly, as shown at 24 in Fig. 4. The bend or flexure 24 in the tines prevents the latter from moving longitudinally across the rake shaft 14, and the frictional grip of the tines on the rake shaft prevents the tines and the channel member from moving longitudinally of the rake shaft. The channel member 23 also acts as a spacer to prevent longitudinal movement of the entire rake construction in the U-shaped yoke.

When it is desired to use the tool as a sweep rake, it is turned to the position shown in Figs. 1 and 2, in which position the fork teeth 22 will be held tightly against the longitudinal member 10 by the tension in the springs 18.

When it is desired to convert the tool to a fork, the tool is simply inverted and the tines 20 and 21 are pressed against the ground to rotate the entire rake structure until the levers 16 pass their dead-center position, at which time the springs 18 will snap the levers to the position of Fig. 3, urging the rake tines 20 and 21 upwardly toward the yoke 10, as shown in Fig. 3.

If found desirable, a stop bar 25 may be welded to the side frame arms 11 so as to extend thereacross in spaced relation to the horizontal member 10 to stop the upward swing of the tines 20 and 21 at the proper angle for convenient fork use.

It will be noted that the free extremities of the tines 20 and 21 are curved, as shown at 26, to properly shape them for gathering leaves and the like, and it will be also noted that the extremities of the fork teeth 22 are bent, as shown at 27, to provide forwardly extending extremities for convenient gathering and lifting of leaves and trash.

While two of the levers 16 and two of the springs 18 have been illustrated, it is to be understood that a single lever and a single spring of suitable strength will accomplish the same purpose.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A convertible tool comprising a horizontal frame portion, side arms formed on and extending from the extremities of said frame portion in parallel spaced relation, a rotatable rake shaft extending between said side frame arms and extending at its extremities through said arms, a set of rake tines mounted on said rake shaft between said frame arms and extending outwardly from between said frame arms in operative position, a second set of tines extending from said shaft in a direction opposite said first set of tines and abutting said frame portion to provide a stop for rotation of said rake shaft, a lever fixed on a projecting extremity of said rake shaft, a tension spring extending from the end of said lever to a spring attaching means on the adjacent side frame arm in a direction toward said frame portion, whereby rotation of said rake shaft in a direction to extend said spring will move said first set of rake tines toward abutting relation with said horizontal frame portion and extend said second set of tines to operative position, said spring serving, when past its aligned position with said side arm to facilitate said rotation with an over-center snap action.

References Cited in the file of this patent

UNITED STATES PATENTS

| | | |
|---|---|---|
| 329,046 | Jincks | Oct. 27, 1885 |
| 481,895 | Coldwell | Aug. 30, 1892 |
| 496,220 | Gibbs | Apr. 25, 1893 |
| 795,383 | Arason | July 25, 1905 |
| 856,464 | Haven et al. | June 11, 1907 |
| 1,263,255 | Kohler | Apr. 16, 1918 |
| 1,905,671 | Aitkenhead | Apr. 25, 1933 |
| 2,126,719 | Beall | Aug. 16, 1938 |
| 2,211,379 | MacIvor | Aug. 13, 1940 |
| 2,623,603 | Cutlan et al. | Dec. 30, 1952 |